No. 797,448. PATENTED AUG. 15, 1905.
J. D. METCALF.
STEERING AND BRAKING MECHANISM.
APPLICATION FILED JAN. 4, 1905.

Witnesses
Edwin G. McKee
F. S. Elmore

Inventor
Jefferson D. Metcalf
By Victor J. Evans
Attorney

UNITED STATES PATENT OFFICE.

JEFFERSON D. METCALF, OF DARRINGTON, MISSISSIPPI.

STEERING AND BRAKING MECHANISM.

No. 797,448.  Specification of Letters Patent.  Patented Aug. 15, 1905.

Application filed January 4, 1905. Serial No. 239,659.

*To all whom it may concern:*

Be it known that I, JEFFERSON D. METCALF, a citizen of the United States, residing at Darrington, in the county of Wilkinson and State of Mississippi, have invented new and useful Improvements in Steering and Braking Mechanisms, of which the following is a specification.

This invention relates to steering and braking mechanisms designed especially for use upon motor-vehicles, and has for its objects to produce a simple, inexpensive device of this character in which the braking mechanism is connected with and operable by the steering-bar, whereby the latter may be manipulated for guiding and controlling the speed of the vehicle, and, further, to equip the machine with an auxiliary brake in convenient reach of the operator and adapted for immediately and completely stopping the vehicle.

To these ends the invention comprises the novel features of construction and combination of parts more fully hereinafter described.

Figure 1:
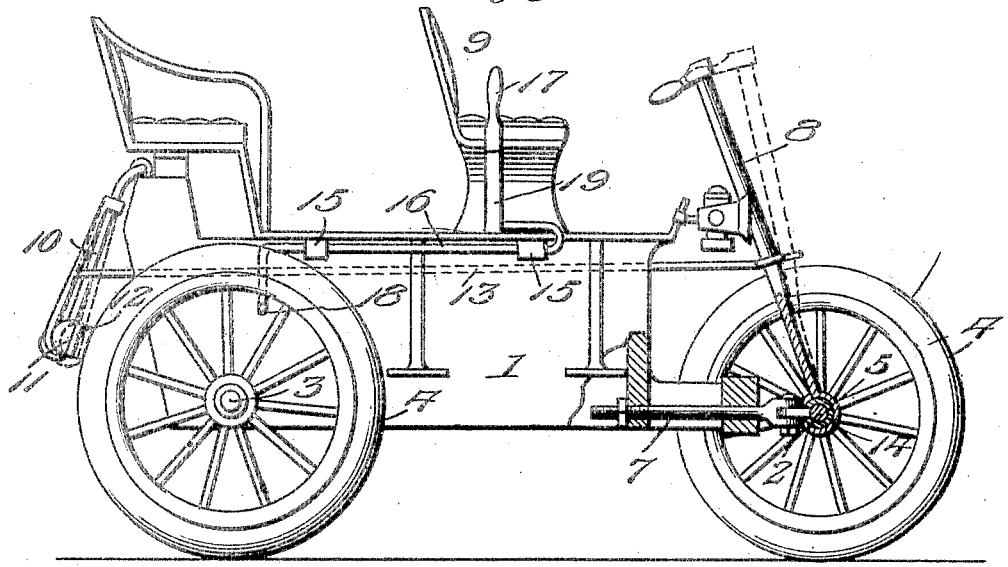
Figure 2:
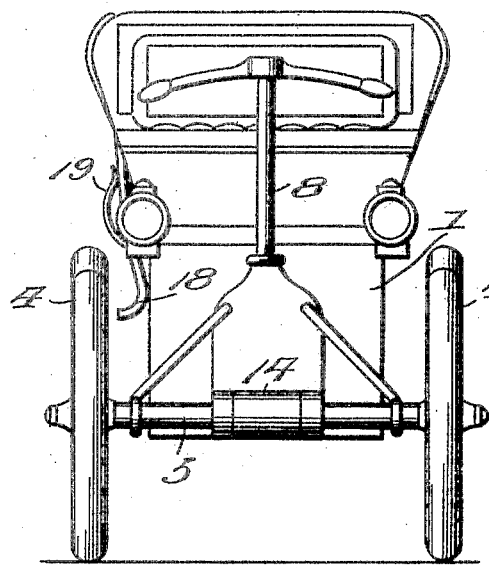
Figure 3:
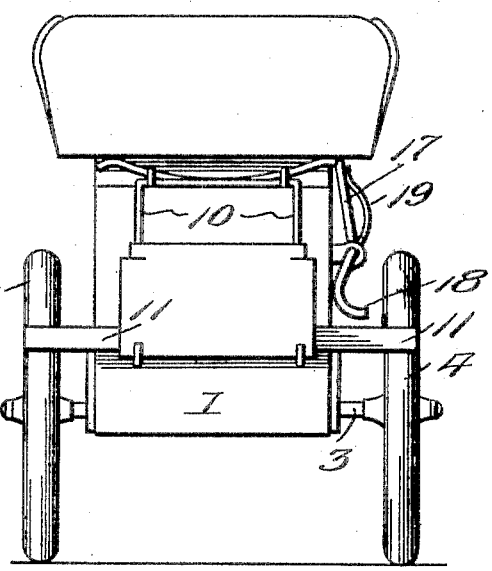

In the accompanying drawings, Figure 1 is a side elevation, partly in section, of a motor-vehicle equipped with my improved device. Fig. 2 is a front elevation of the same. Fig. 3 is a rear end elevation.

Referring to the drawings, 1 designates the body of the vehicle, which is hollow, as shown, and provided with a front axle 2 and a rear axle 3, carrying transporting-wheels 4, the front axle being journaled in a bearing 5, pivoted, as at 6, to the outer end of a coupling or draw bar 7 and adapted to be swung in a horizontal plane by means of a steering-post 8, equipped with a handle-bar which may be conveniently reached from the front seat 9 of the vehicle for turning the axle 2 and front wheels in guiding the machine.

Pivotally connected with the rear end of the body 1 is a suitable hanger or hangers 10, carrying a horizontal brake-beam 11, provided at its ends with shoes 12, arranged in position for engagement with the rear wheels 4, there being connected with the brake-supporting mechanism a brake-rod 13, extended longitudinally of and through the body 1 and engaged at its forward end with the steering-post 8, which latter is pivoted at its lower end, as at 14, upon the axle 2 to swing in a vertical plane toward and from the front of the machine. It is apparent that under this arrangement when it is desired to check the speed of the machine the operator may move the upper end of the steering-post outwardly, as indicated by dotted lines in Fig. 1, and thereby through the medium of the rod 13 exert traction upon the brake-supporting hangers 10, thus causing the latter to swing inward toward the rear end of the machine and move the shoes 12 into contact with the rear wheels, as indicated by dotted lines in said figure. It is obvious that under this construction the operator will be enabled not only to guide the machine in its travel over the ground, but also to check the speed when circumstances require by means of the steering-post 8, which latter thus serves the twofold function of a steering and brake-operating member.

Extended longitudinally of the machine at one side thereof and journaled for rotation in suitable bearings 15 is a braking-rod 16, provided at its forward end with a vertical operating-lever 17, arranged within convenient reach from the seat 9, the said rod having at its rear end an integral angularly-bent engaging portion or shoe 18. This rod, which is maintained in normal position by means of a suitable spring 19 and with the shoe 18 in the position illustrated in Figs. 2 and 3, may through the medium of the lever 17 be rocked on its axis for moving the shoe outward between a pair of the spokes of the adjacent rear wheel 4 to thereby positively stop the movement of the wheel and instantaneously and completely check the movement of the vehicle, as will be readily understood.

From the foregoing it is apparent that I produce a simple inexpensive device in which the guiding and braking mechanisms are under complete control of the operator, it being understood that in attaining these ends minor changes in the details herein set forth may be resorted to without departing from the spirit of the invention.

Having thus fully described the invention, what is claimed as new is—

A vehicle-body having front and rear axles provided with transporting-wheels, a brake-beam pivotally supported to swing toward and from the rear wheels, a steering-bar pivotally connected at its lower end directly with the front axle and adapted to swing toward and from the front of the machine, and operative connections between the steering-bar and brake-supporting means whereby the brake may be actuated by movements of the steering-bar.

In testimony whereof I affix my signature in presence of two witnesses.

JEFFERSON D. METCALF.

Witnesses:
   J. M. PEARCE,
   R. H. RICHARDSON.